(12) United States Patent
Glück et al.

(10) Patent No.: US 8,746,416 B2
(45) Date of Patent: Jun. 10, 2014

(54) LINEAR GUIDING DEVICE WITH BRAKING APPARATUS

(75) Inventors: Stefan Glück, Schweinfurt (DE); Gabor Kovacs, Oberweningen (CH)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 513 days.

(21) Appl. No.: 12/719,048

(22) Filed: Mar. 8, 2010

(65) Prior Publication Data

US 2011/0229064 A1    Sep. 22, 2011

(30) Foreign Application Priority Data

Mar. 11, 2009   (DE) .......................... 10 2009 012 626

(51) Int. Cl.
*F16C 29/10*   (2006.01)

(52) U.S. Cl.
USPC ............................................ 188/44; 187/370

(58) Field of Classification Search
CPC ............ B61H 7/00; B61H 7/08; B23Q 1/285; B23Q 1/28; B66B 5/18
USPC ............ 188/42, 43, 165, 171, 44, 41; 384/43, 384/44, 49, 50, 42; 187/370, 376
IPC ....................................................... F16C 29/10
See application file for complete search history.

(56) References Cited

U.S. PATENT DOCUMENTS

| | | | | |
|---|---|---|---|---|
| 6,053,287 A * | 4/2000 | Weinberger et al. | ........... | 187/370 |
| 6,227,336 B1 * | 5/2001 | Rudy | ................ | 188/43 |
| 7,029,214 B2 * | 4/2006 | Shiba et al. | ................... | 409/241 |
| 7,395,903 B2 * | 7/2008 | Takahashi et al. | ........... | 188/72.1 |
| 2008/0230330 A1 * | 9/2008 | Herr | ............................ | 188/72.7 |

FOREIGN PATENT DOCUMENTS

| | | | | |
|---|---|---|---|---|
| DE | 197 15 014 A1 | 10/1998 | | |
| DE | 10 2004 044 052 A1 | 3/2006 | | |
| DE | 10 2004 053 390 A1 | 5/2006 | | |
| DE | 10 2006 008 403 A1 | 8/2007 | | |
| EP | 0 936 366 A2 | 8/1999 | | |
| JP | 03061728 A * | 3/1991 | ............. | F16D 63/00 |

* cited by examiner

*Primary Examiner* — Bradley King
*Assistant Examiner* — Stephen Bowes
(74) *Attorney, Agent, or Firm* — Simpson & Simpson, PLLC

(57) ABSTRACT

A linear guide with a guide carriage longitudinally movably arranged on a guide rail, which is preferably U-shaped and a braking device effectively arranged between the guide rail and the guide carriage. An actuator for actuating the braking device is provided and the actuator has an electro-active polymer effectively arranged in the longitudinal axis of the linear guide which engages around the guide rail for actuating the braking device.

7 Claims, 3 Drawing Sheets

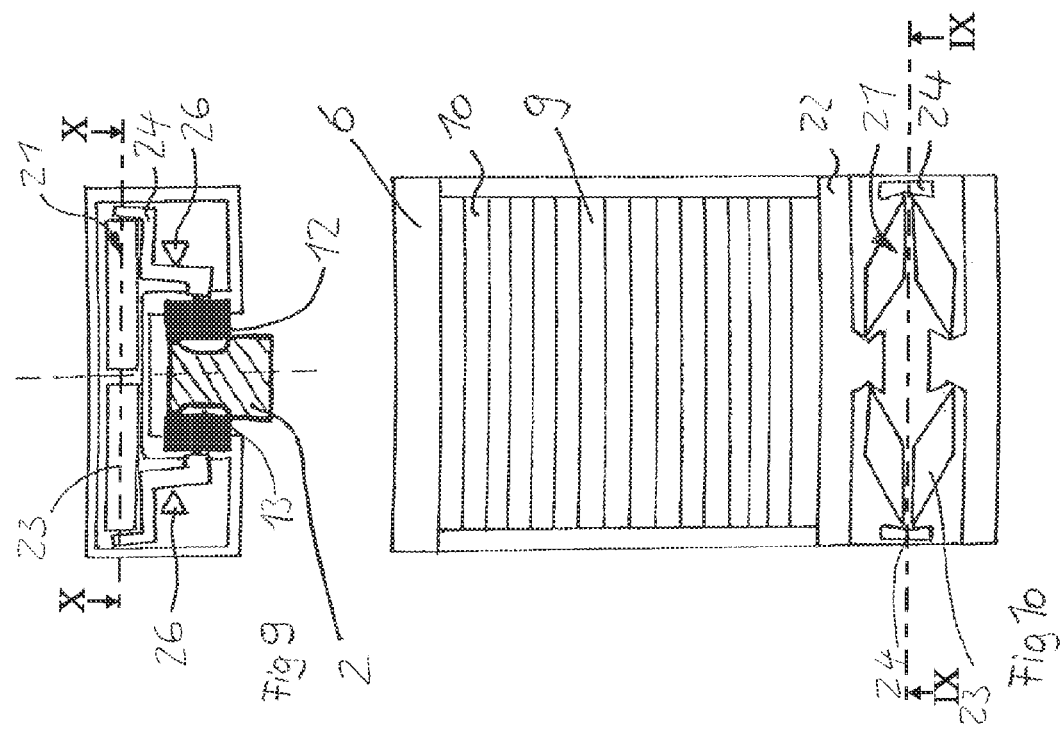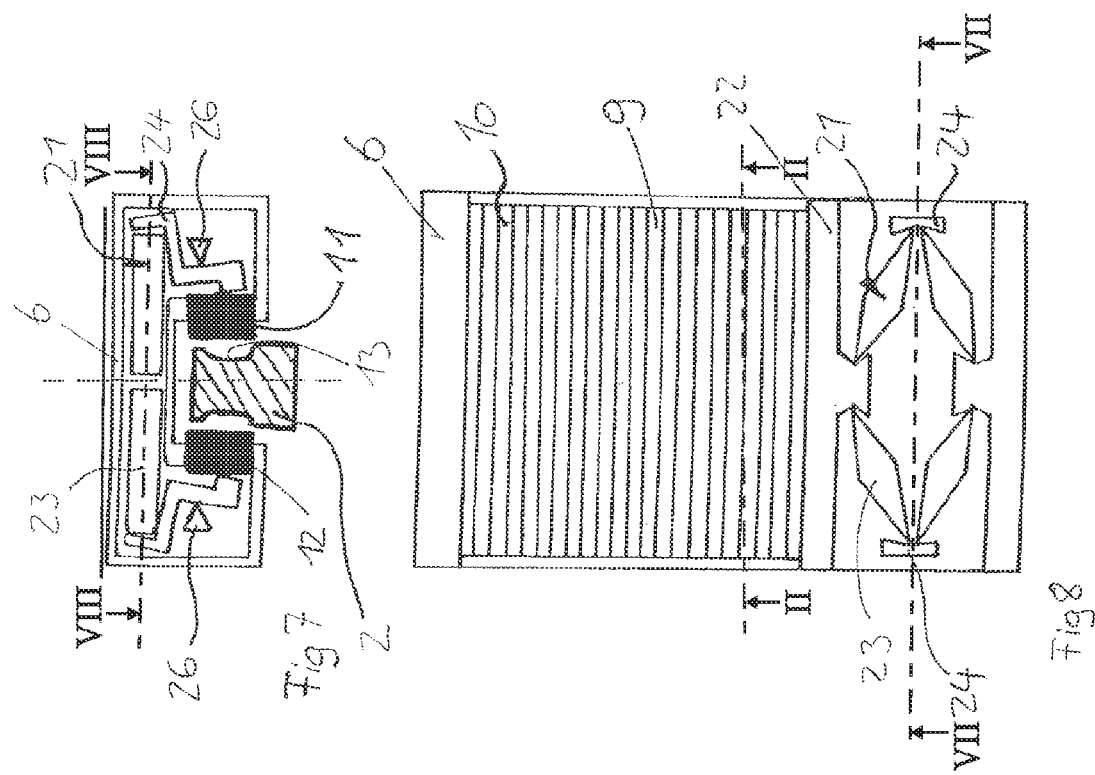

LINEAR GUIDING DEVICE WITH BRAKING APPARATUS

Figure 1:
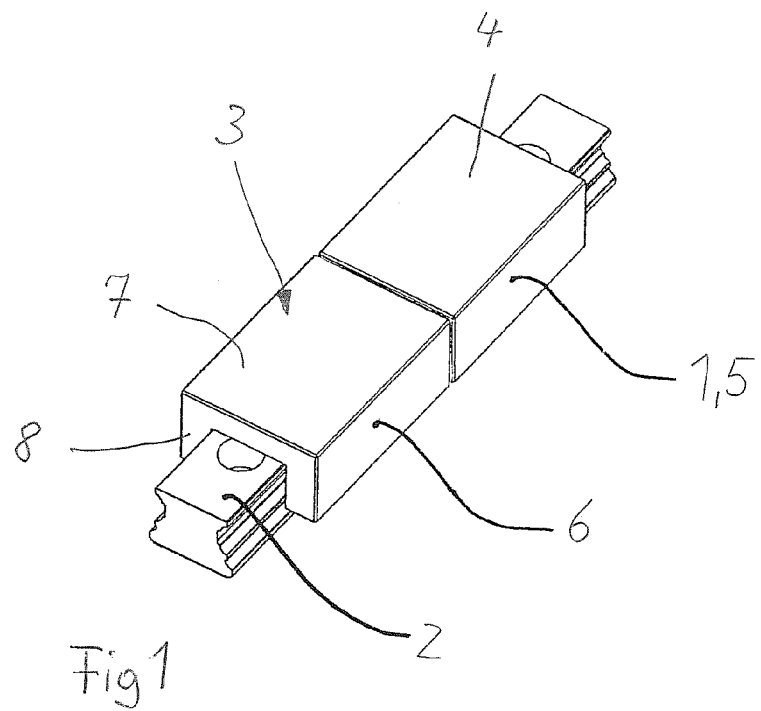

This application claims the priority of DE 10 2009 012 626.0 filed Mar. 3, 2009, which is incorporated by reference herein.

The present invention relates to a linear guide with a braking device. Linear guides of this kind can be used when a guide carriage that is longitudinally movable on a guide rail is to be braked, for instance as a result of a power failure, or for fixing machine parts in certain positions.

Linear guides of the generic type with a braking device and/or clamping device are known for some time. Thus, EP 0 936 366 A2 and DE 10 2004 053 390 A1 disclose linear guides having a substantially H-shaped basic body, the limbs of which can be bent open or contracted by means of an outer force in order to, in effect, cause a clamping force for connected clamping jaws.

In this respect, EP 0 936 366 A2 describes a braking device for a linear guide which has, on the one hand, a wedge gate which can be actuated by a spring force, which wedge gate is itself guided in a guide rail of the basic body and can be released again by way of a hydraulically or pneumatically actuable piston. On the other hand this publication proposes an electromechanic force transducer in the form of a piezo-actuator for application of the clamping force. Finally, in order to apply the clamping force, so-called knee levers are used, which are actuated or actuable in the one adjusting direction by way of an energy store and in the other adjusting direction by way of a hydraulically or pneumatically actuable working piston in order to cancel the clamping force on the brake jaws, wherein as the energy store, disk springs, helical springs or gas pressure springs may be used.

DE 10 2004 053 390 A1 further describes as a clamping device a magnetically driven mechanical actuating element, which acts on a tensioning element.

Furthermore, linear guides are known which have a substantially U-shaped basic body, also called a support body, in which the guide rail is guided axially (DE 295 05 080 U1, DE 197 15 014 A1, DE 10 2004 044 052 A1, DE 10 2006 008 403 A1). In these linear guides as well, pneumatic, hydraulic, electromagnetic and electromotive systems are favored for pressurization of brake shoes or clamping jaws that are arranged on both sides of the guide rail or for generation of a counter force to a pre-tensioning force applied to the brake shoes or clamping jaws by way of a tension spring.

The known technical solutions for clamping and/or braking devices on linear guides have in common that they are relatively complex and cost intensive in their production and that, because of the plurality of individual parts, they are prone to failure and therefore, maintenance-intensive. The installation size of these clamping and/or braking devices is also a problem, since conventional brake and/or clamping devices on linear guides are attached to or onto the guide as additional components and therefore require additional installation space. If, for instance, an additional brake shoe is attached to the guide rail, this brake shoe may, under certain circumstances, restrict the length of the linear travel available. Most of the time, the dimensions of such clamping jaws also exceed the structural clearance of a standardized guide carriage and therefore cannot be integrated into the system or only after extensive adjustment of the modification parts. As a result of the space circumstances (for instance limited installation height), integration is oftentimes not possible at all.

Furthermore, linear guides with pneumatically or hydraulically actuable brake or clamping devices are not suitable for every application, since for instance the necessary supply of media like pressurized air or hydraulic oil is not possible or not desirable, which is the case, for instance, in axially movable patient beds on medical equipment like x-ray or computer tomography devices.

Especially in axially movable patient beds, linear electric direct drives are increasingly preferred, which direct drives, compared to the conventional solutions having toothed belts or screw drives, have advantages regarding dynamics, installation space and noise, but do not provide self-locking in a chosen set position. However, for security as well as handling reasons (precision etc.), a self-locking behavior of the drive and/or the possibility to block the bed against further movement is necessary in such patient beds. Since the supply of pressurized air and hydraulic oil is not possible or not desirable in the medical field, an electrically actuable brake and/or clamping system seems necessary in the linear guide in question. However, existing electric systems of the type described above are very complex and expensive.

It was the object of the present invention to specify a linear guide according to the features of the preamble of claim 1 which affords a simple design.

According to the invention, this object is achieved by the linear guide according to claim 1. Because the actuator has a U-shaped electro-active polymer encompassing the linear guide for actuating the braking device, which polymer is effectively arranged in the longitudinal axis of the guide rail, a particularly simply designed linear guide can be provided:

In a paper published in the magazine "ThemaForschung February 2008" ("subject research February 2008"), electro-active polymers were referred to in detail:

Noiseless drives without electro-motors can be realized by solid-state actuators, in which functional materials are deformed by way of electrical stimulation. In comparison to piezo-electrical materials, electro-active polymers (EAP) can achieve expansions of approximately 35%. In this, they correspond to natural muscle tissue in their actuating path and forces. The forces necessary for the large expansion are produced by electro-static fields above the dielectric material. By means of a novel multi-layer technology, manageable stack actuators can be produced as actuator arrays shaped as desired for diverse applications like tactile displays and fluid delivery systems.

For small stroke movements, the inverse piezo-electric effect is used for several decades (piezo-electric drive): By applying voltage to the control electrode of a piezo-ceramic, the piezo-ceramic deforms. Even though the expansion reaches only 0.1% of the material thickness at most, this is achieved with very high forces. Compared with rigid piezo-ceramics, plastics (polymers) are considerably lighter, more flexible and permit unlimited design. Like piezo-electric drives, electro-active polymers change shape due to electrical signals. According to their mode of operation, they are divided into electronic and ionic electro-active polymers.

In the first group of EAP's the deformation is achieved by electron transport. This includes ferro-electric polymers like PVDF according to the piezo-electric effect. Polymers grafted on long chains, the "ladder rungs" of which contract by way of electrical fields, reach a comparable effect. A very solid class is composed of dielectric polymer actuators, which have a high degree of efficiency and rapid reaction time on the scale of microseconds and which are stimulated electro-statically. Electro-static elastomeric actuators consist of an elastic dielectric material between two resilient electrodes. By applying voltage to the electrodes, the dielectric material is compressed by way of the mutually attracting charges. Until now, two material classes are used for the dielectric layer: soft elastic polymer films from acryl or silicon. Resilient electrodes can be realized in thin layers from graphite powder. The volume of elastomers can be regarded as virtually constant because of the very limited compressibility. Because of the visco-elastic properties of elastomers, the control characteristic of the actuators describes a hysteresis. Elastomers can be deformed up to a thickness expansion of approximately 35%, this corresponds to 50 to 100 times that of the piezoelectric materials. In contrast to crystals and ceramics, elastomers have very high disruptive strengths, more than 30 times that of air, so that high electrostatic pressures of up to 100 kPa can be established.

In order to limit the voltages, the thickness of the dielectric material may be in the micrometer realm, so that despite the large expansions only small deflections can be obtained. In order to achieve larger movements or forces, special actuator arrangements may be employed. In the case of roller actuators and bending actuators the expansion perpendicular to the electric field is used.

The stack actuator can consist of many actuator films arranged one above the other, the electrodes of which may be connected alternating in parallel. The area of the actuator determines the achievable force and the number of layers the absolute actuating path, so that actuator deviations in the millimeter realm are possible. Integration of many individual stack actuators in a joint bond is possible.

The invention utilizes the characteristic of the electro-active polymers described in this paper, wherein a very good design, especially in the case of dielectric polymer actuators, can be achieved. Because the electro-active polymer can be shaped in U-form, it is possible to cover almost the entire cross-sectional profile of a guide carriage of a linear guide standardized according to DIN with an electro-active polymer. This means that a very large area and therefore a very high actuating force can be made available. Especially if a plurality of such dielectric polymer actuators is connected in series, as so-called stack actuators, large actuating paths can also be achieved. Consequently, an actuator that is highly effective in the longitudinal direction of the guide carriage can be made available, namely inside the cross sectional profile of the standardized guide carriage.

In the linear guide according to the invention, the compression, effected by applied voltage, of the electro-active polymer is taking place along the longitudinal axis of the linear guide, i.e. the electro-active polymer is effective in the longitudinal axis of the linear guide. The substantial benefit can be seen in the fact that in this axis actuating paths of the actuator can take place inside the cross sectional profile of the guide carriage.

The actuator effectively arranged in the longitudinal axis can be connected in a known manner to braking devices. The braking device may have, in a known manner, a transmission, the input part of which is actuable by the actuator and the output part of which controls brake shoes, which brake shoes are effectively arranged between the guide carriage and the guide rail.

An actuating path of the actuator according to the invention may be assigned to an actuating path of the brake shoes perpendicular to the guide rail by way of a suitable transmission ratio.

The actuator, preferably embodied as a stack actuator, can accommodate compressive forces as well as tensile forces. The actuator is preferably installed in a prestressed state, wherein the prestress may be applied by the spring force of a spring or else by the elastic characteristic of the actuator itself.

In a development according to the invention, the stack actuator is formed by a plurality of planar actuators, arranged along the longitudinal axis of the linear guide one behind the other.

In this case, a first planar actuator of this row may be supported fixedly relative to the frame—for instance on the guide carriage or on a housing of the braking device and a last planar actuator of this row may engage at the braking device. A planar actuator has an elastomeric film, which film as electrodes on both sides. This film can be formed as needed, for instance U-shaped.

In one development according to the invention, an energy store—for instance a spring—may be provided for closing the braking device, wherein the actuator according to the invention may be subjected to voltage for closing of the braking device. When no voltage is being supplied to the actuator, the expanded electro-active polymers hold the spring in a position, in which for instance brake shoes are spaced apart from brake surfaces of the guide rail. The actuator, in this case, is prestressed by the spring force of the prestressed spring.

In an alternative development according to the invention, the prestressing force of an electro-active polymer prestressed in the effective direction may be provided for actuating the braking device. In this case, it may be advantageous if the braking device has a transmission, the input part of which is hinged by the prestressed electro-active polymer, wherein the output part of the transmission can actuate brake shoes of the braking device. Under the action of the prestressing force, the brake shoes can be pressed against brake surfaces of the guide rail. For releasing the braking device, the actuator according to the invention can be loaded with a voltage, so that the electro-active polymer is compressed, therefore becomes shorter in the longitudinal direction of the guide rail. This actuating path of the actuator according to the invention can be used for releasing the braking device via a suitable transmission. In the case of voltage being supplied to the actuator, the braking device is therefore deactivated.

In an embodiment according to the invention, instead of U-shaped guide carriages, a guide carriage may be provided which completely surrounds the guide rail whereas the guide rail may be embodied cylindrically in this case. In the simplest case, the guide carriage may be embodied as a hollow cylinder. The advantageous breaking devices according to the invention can be employed in an easy manner in linear devices developed in this way. In this case, the preferred dielectrical polymers may be embodied in a circular ring and may also be embodied as stack actuators.

The brake shoes mentioned here also serve for clamping of the guide carriage on the guide rail.

Figure 2:
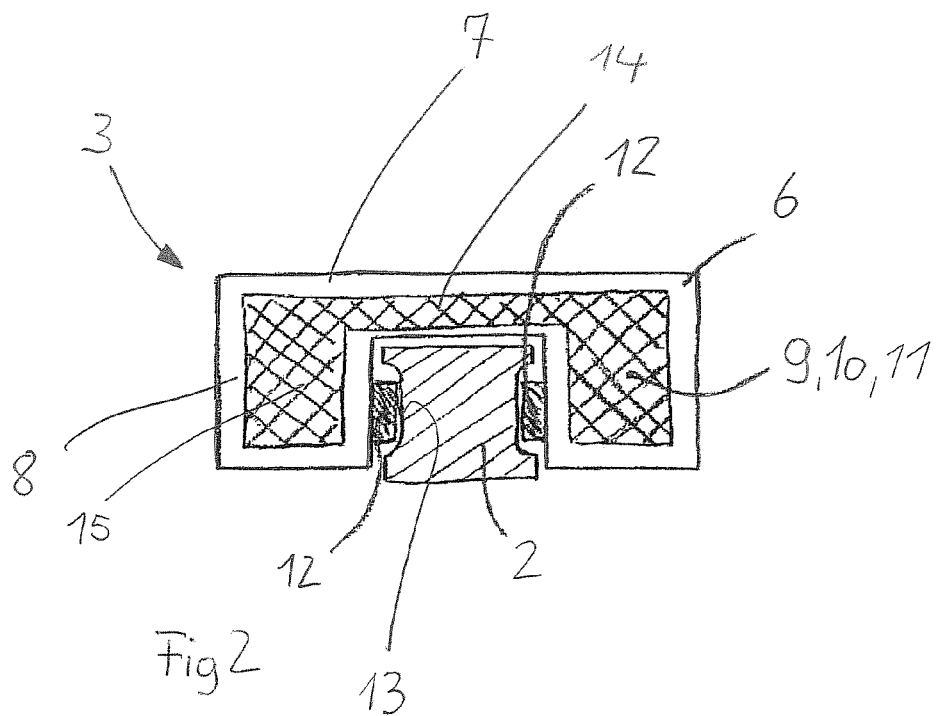
Figure 3:
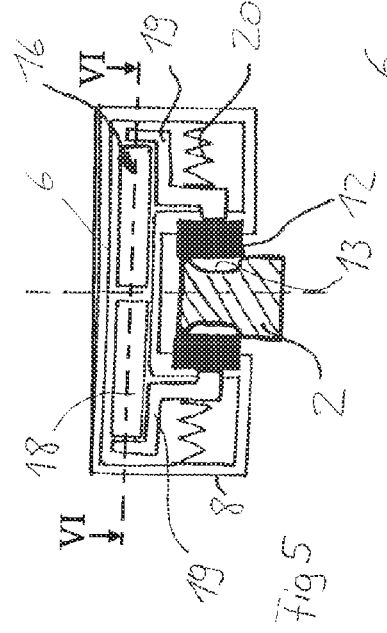
Figure 4:
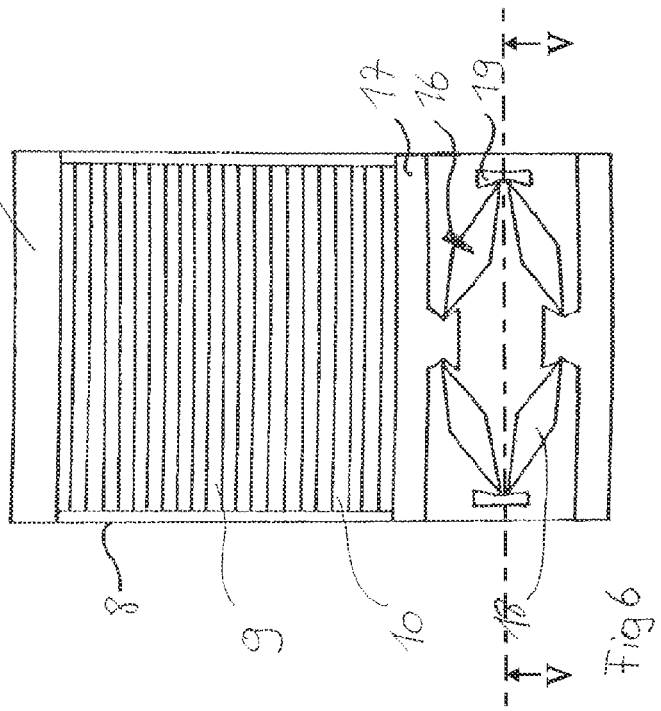
Figure 5:
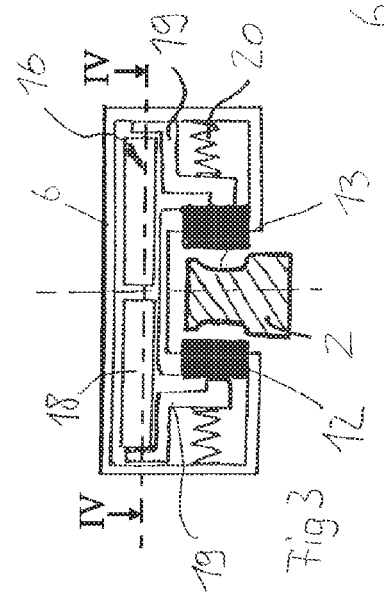
Figure 6:
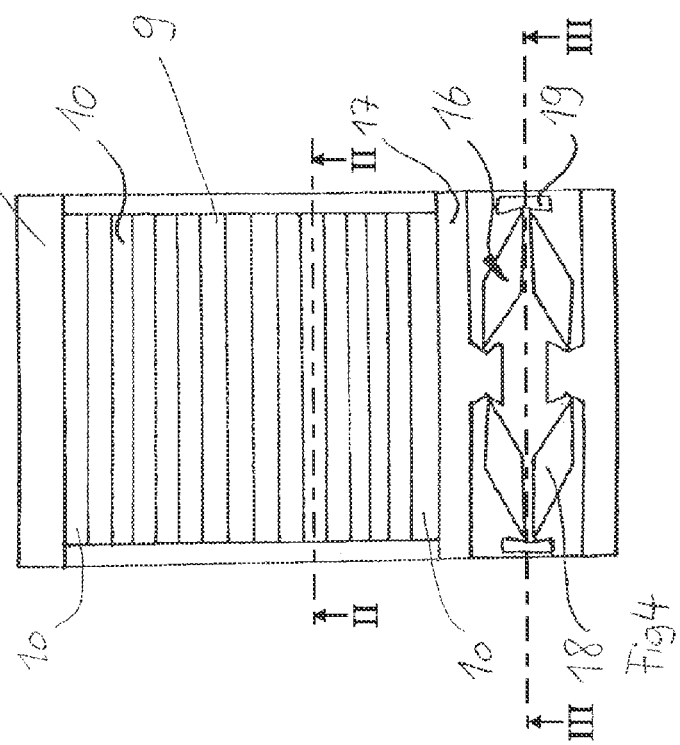

The invention is described below on the basis of two embodiments shown in 10 figures in all. In the figures:

FIG. 1 shows a linear guide according to the invention in a perspective view, FIG. 2 shows a cross-section through the linear guide according to the invention from FIG. 4, FIG. 3 shows a further cross-section through the linear guide according to the invention from FIG. 4, FIG. 4 shows a top cross-section view of a longitudinal section of the guide carriage of the linear guide from FIG. 3, FIGS. 5 and 6 show views as in FIGS. 3 and 4, but in a modified operating position, FIGS. 7 to 10 show a modified linear guide according to the invention in views according to FIGS. 3 to 6.

FIG. 1 shows a linear guide according to the invention in a perspective view. A guide carriage 1 is supported on a guide rail 2 in a longitudinally displaceable manner. The bearing may be a slide bearing or else a roller bearing may be provided.

A braking device 3 is attached to one end side of the guide carriage 1. This braking device 3 is effectively arranged between the guide rail 2 and the guide carriage 1. When the braking device 3 is activated, the guide carriages is braked and held in braking position.

The guide carriage 1, which is designed with a U-shape, has a back 4 and two legs 5, in which one of the legs 5 each merges into a longitudinal side of the back 4. The guide carriage 1 engages around the guide rail 2 with these two legs 5.

The braking device 3 is arranged in the structural clearance of the guide carriage 1, namely in the direction along the guide rail 2. The design of the guide carriages in profiled rail linear guides is standardized. The braking arrangement 3 according to the invention is adapted to this standard, whereas it is ensured that the braking device does not exceed the cross-sectional contour or the structural clearance of the guide carriage.

FIG. 1 indicates that the braking device 3 has a U-shaped housing 6 with a back 7 and two legs 8 merging on the longitudinal sides of back 7, such that the braking device 3 engages around the guide rail 2 with its U-shaped housing.

FIG. 2 shows a cross-section through the braking device 3 from FIG. 1. Inside the housing 6 of braking device 3, an actuator 9 is provided for actuation of the braking device 3. In the exemplary embodiment, actuator 9 is realized as a planar actuator 10, wherein a dielectric electro-active polymer 11 is formed in a known manner by an elastomeric film with electrodes applied on both sides. A plurality of these dielectric electro-active polymers 11 is arranged one behind the other along guide rail 2.

Planar actuator 10 shown in FIG. 2 is formed in a U-shape and has a back 14 and two legs 15 merging in one piece with back 14. Here, the advantage of the described dielectric electro-active polymers 11 becomes apparent, which dielectric electro-active polymers 11 can be provided in almost any desired contour. In the exemplary embodiment, the contour of the electro-active polymer 11 corresponds approximately to the contour of the guide carriage 1, so that the electro-active polymer 11 substantially fills the entire cross-sectional area of the guide carriage 1. The larger the area of the planar actuator 10, the more force can be exerted in the effective direction of actuator 9. The larger the number of planar actuators 10 that are arranged one behind the other along guide rail 2, the larger the provided actuating path of actuator 9 can be. In many applications, enough space is available in the longitudinal direction of the guide rail, so that the braking device 3 can be accommodated without problem.

In the exemplary embodiment, the braking device 3 furthermore has brake shoes 12 for pressing against the brake surfaces 13 located on the guide rail 2 on the longitudinal sides thereof.

FIGS. 3 and 4 show the linear guide according to the invention with disengaged braking device 3. This is to say, the brake shoes 12 are not pressing against the brake surfaces of the guide rail 2.

In FIG. 4 it can clearly be seen that actuator 9 consists of a plurality of planar actuators 10 arranged one behind the other along guide rail 2. A first planar actuator 10 is supported on the housing 6 of the braking device 3. A last planar actuator 10 of the actuator 9 is connected to a knee lever transmission 16. An input part of the knee lever transmission 16 can be acted upon by the actuator 9, whereas a displacement of the input part 17 effects a displacement of an output part 19 of the knee lever transmission via the knee levers 18. The brake shoes 12 are connected to the output parts 19.

By way of the knee lever transmission 16, an actuating path of input part 17 along the longitudinal axis of the guide rail 2 is translated into an actuating path of the brake shoes 12 perpendicular to the longitudinal axis of the guide rail 2.

FIGS. 3 and 4 show the linear guide according to the invention with deactivated braking device 3. FIGS. 5 and 6 show the linear guide according to the invention with activated braking device 3.

FIG. 6 clearly shows that actuator 9 is compressed. This compression is the result of application of voltage to the actuator 9. As a result of this voltage, the individual planar actuators 10 are compressed in the longitudinal direction of the guide rail 2, wherein the overall compression path is the product of the number of planar actuators 10 and the individual compression path of each planar actuator.

Therefore, the input part 17 of the knee lever transmission 16 is also displaced in the longitudinal direction of the guide rail 2, so that an actuating path of the output parts 19 of the knee lever transmission 16 is effected perpendicularly to the longitudinal axis of the guide rail 2 via the knee levers 18. This actuating path of the output parts 19 is supported by the spring force of pressure springs 20, which are supported on one side on the housing 6 and on the other side are resiliently biased against the output parts 19 in the direction of the guide rail 2. In this exemplary embodiment, the brake force of the braking device 3 is determined by the spring force of the pressure springs 20.

In comparison of FIGS. 4 and 6 it becomes apparent that the knee levers 18 are effecting corresponding different positions of the output parts 19 in different deflection positions.

When the voltage is removed from the actuator 9, the individual planar actuators 10 are expanding in the direction of the longitudinal axis of the guide rail 2, namely against the spring force of the compression springs 20.

The number of planar actuators 10 arranged one behind the other in a row is dependent, among others, from the desired actuating path.

The alternative exemplary embodiment according to the invention shown in FIGS. 7-10 substantially differs from the exemplary embodiment described above in that the brake force is exerted by the actuator 9, while, in the exemplary embodiment described above the brake force is produced by the compression springs.

In this alternative linear guide according to the invention, a modified knee lever transmission is provided, differing from the exemplary embodiment described above. An input part 22 may be actuated by the actuator 9 as described before. An actuating path of the input part 22 is translated via knee levers 23 onto tilt levers 24, wherein the knee levers 23 engage on one end of the tilt lever 24 and wherein the brake shoes 12 are connected on the opposite ends of the tilt levers 24. A tipping axis 26 of the tilt levers 24 is arranged between these two ends.

The comparison of the two FIGS. 7 and 9 clearly shows, that while voltage is applied to the actuator 9, the tilt levers 24 are tilted about the tipping axis 26, whereas the brake shoes 12 lift up from the brake surfaces 13. FIG. 8 shows the compressed actuator 9 under applied voltage. FIG. 10 shows the un-compressed but preloaded actuator 9.

When no voltage is applied to the actuator 9, the brake shoes 12 are resiliently biased against the brake surfaces 13, whereas the required brake force is caused by the actuator 9 which is preloaded in the longitudinal direction of the guide rail 2. Under this preload, actuator 9 presses against the input part 22 of the knee lever transmission 21, so that the tilt levers 24 tilt against the brake surfaces 13 of the guide rail 2 with their ends carrying the brake shoes 12.

Instead of the tilt lever transmission described in these two exemplary embodiments, another transmission may be provided which translates an actuating path of the actuator 9 into an actuating path of the brake shoes 12.

In the second exemplary embodiment, the planar actuator 10 is also embodied in a U-shape, so that as large as possible a cross-sectional area is covered, in order to achieve as large as possible a force from the actuator 9, which consists of a plurality of planar actuators 10.

LIST OF REFERENCE NUMBERS

1 Guide carriage
2 Guide rail
3 Braking device
4 Back
5 Leg
6 Housing
7 Back
8 Leg
9 Actuator
10 Planar actuator
11 Electro-active polymer
12 Brake shoe
13 Braking surfaces
14 Back
15 Leg
16 Knee lever transmission
17 Input part
18 Knee lever
19 Output part
20 Compression spring
21 Knee lever transmission
22 Input part
23 Knee lever
24 Tilt lever
26 Tipping axis

The invention claimed is:

1. A linear guide, comprising:
 a guide carriage having a U-shaped cross-sectional area and being longitudinally movably arranged on a guide rail; and
 a braking device attached at one end side of the guide carriage and effectively arranged between the guide rail and the guide carriage,
 wherein the braking device includes a housing and an actuator for actuating the braking device, the actuator being disposed in the housing of the braking device, and
 wherein the actuator has an electro-active polymer effectively arranged in a longitudinal axis of the linear guide for actuating the braking device, the electro-active polymer being a plurality of planar actuators arranged in a row along the longitudinal axis of the linear guide, each of the planar actuators comprising an elastomeric film having two sides with electrodes on both of the sides of the elastomeric film, and
 wherein the electro-active polymer is U-shaped so that the electro-active polymer substantially fills the U-shaped cross-sectional area of the guide carriage.

2. The linear guide according to claim 1, wherein a first planar actuator of a row of the plurality of actuators is supported fixedly relative to a frame of the housing, and wherein a last planar actuator of the row of the plurality of actuators engages at an input part of the braking device.

3. The linear guide according to claim 1, wherein brake shoes are provided to be arranged between two legs of the guide carriage and the guide rail.

4. The linear guide according to claim 3, wherein the braking device has a transmission, an input part of which can be acted on by the actuator and an output part actuates the brake shoes.

5. The linear guide according to claim 4, wherein an actuating path of the actuator along the longitudinal axis of the linear guide is assigned to an actuating path of the brake shoes perpendicular to the guide rail.

6. The linear guide according to claim 1, wherein an energy store is provided for closing the braking device and the actuator is provided for opening the braking device.

7. The linear guide according to claim 1, wherein the actuator is U-shaped having a base and two legs, the two legs of the actuator engaging around the guide rail.

* * * * *